United States Patent [19]

Ikeda et al.

[11] Patent Number: 4,729,250

[45] Date of Patent: Mar. 8, 1988

[54] LEAD SCREW FOR MOVING A HEAD

[75] Inventors: Yoshiaki Ikeda; Yoshio Tamura; Hiroshi Noritake, all of Tokyo, Japan

[73] Assignee: Seikosha Co., Ltd., Tokyo, Japan

[21] Appl. No.: 822,689

[22] Filed: Jan. 23, 1986

Related U.S. Application Data

[63] Continuation-in-part of Ser. No. 619,003, Jun. 11, 1984, abandoned.

[30] Foreign Application Priority Data

Jun. 10, 1983 [JP] Japan ................................ 58-103805

[51] Int. Cl.$^4$ ................. F16H 27/02; F16H 29/02; F16H 29/20
[52] U.S. Cl. ............................ 74/89.15; 249/59; 74/DIG. 10; 74/59
[58] Field of Search ................. 74/DIG. 10, 58, 59, 74/89.15; 249/59; 264/318

[56] References Cited

U.S. PATENT DOCUMENTS

| | | | |
|---|---|---|---|
| 359,735 | 3/1887 | Messerle | 249/59 |
| 2,346,291 | 4/1944 | Cisski | 249/59 X |
| 2,891,283 | 6/1959 | Cramer et al. | 249/59 |
| 3,054,145 | 9/1962 | Helpa | 249/59 X |
| 3,289,491 | 12/1966 | Conrad | 74/DIG. 10 |
| 3,843,088 | 10/1974 | McLoughlin | 249/59 X |
| 4,030,137 | 6/1977 | Dalziel | 360/106 |
| 4,037,483 | 7/1977 | Nadal | 74/DIG. 10 |
| 4,299,371 | 11/1981 | Duga | 249/59 X |
| 4,440,038 | 4/1984 | Potter | 74/89.15 |
| 4,528,607 | 7/1985 | Thompson | 360/106 |

FOREIGN PATENT DOCUMENTS

| | | | |
|---|---|---|---|
| 1043062 | 11/1978 | Canada | 264/318 |
| 549302 | 4/1932 | Fed. Rep. of Germany | 74/59 |
| 51-27708 | 8/1976 | Japan | 249/59 |
| 842850 | 7/1960 | United Kingdom | 74/58 |

OTHER PUBLICATIONS

Emmelot, "Rescan Drive...", IBM Technical Disclosure Bulletin, vol. 4, No. 6, p. 783, Nov./Dec. 1979.

Primary Examiner—Dirk Wright
Attorney, Agent, or Firm—Bruce L. Adams; Van C. Wilks

[57] ABSTRACT

A lead screw for moving, for example, a printing head or a magnetic head. The screw is molded from plastics by a split mold comprising a plurality of longitudinally extending sections. It has on its outer peripheral surface a helical groove satisfying the following relationship:

$$L \geq \frac{P}{360}\left[\cos^{-1}\frac{r}{R}\sin\frac{\theta}{2} - \cos^{-1}\sin\frac{\theta}{2}\right]$$

where
P: pitch of the groove;
R: radius of the screw;
r: radius of the screw between its longitudinal axis and the bottom of the groove;
$\theta$: angle of division of the mold sections; and
L: a half of the difference in width between the top and bottom of the groove. The bottom of the groove is smaller in width than the top thereof.

5 Claims, 11 Drawing Figures

LEAD SCREW FOR MOVING A HEAD

This is a continuation-in-part of application Ser. No. 619,003, filed June 11, 1984, now abandoned.

BACKGROUND OF THE INVENTION

1. Field of the Invention

This invention relates to a lead screw for moving a head, such as a printing head in a printer or a magnetic head in a magnetic disc apparatus.

2. Description of the Prior Art

There is known a lead screw for moving a printing or magnetic head. It has a helical groove of which the sidewalls are perpendicular to the outer peripheral surface of the screw, and which is, therefore, rectangular in cross section. A typical lead screw is shown fragmentarily at 1 in FIGS. 1 and 2. It has a helical groove 2 which is rectangular in cross section, as shown in FIG. 2. The outer edges 3 of the groove 2, therefore, make partly invisible the inner or bottom edges 4 and the bottom of the groove 2 as indicated at 5 in FIG. 1, when the screw 1 is, for example, looked at in front elevation. The invisible portions 5 are usually called undercuts, and have heretofore made it impossible to mold the screw 1 from plastics. There has been no alternative but to make the groove 2 by cutting. The cutting of a helical groove, however, requires a high level of technique and a lot of time, and results, therefore, in an expensive lead screw.

SUMMARY OF THE INVENTION

It is an object of this invention to provide a lead screw which can be molded from plastics without forming any such undercut.

The lead screw of this invention is manufactured by using a longitudinally split mold preferably comprising four mold sections. The screw has a helical groove having a narrowed bottom, and satisfies the following relationship:

$$L \geq \frac{P}{360}\left[\cos^{-1}\frac{r}{R}\sin\frac{\theta}{2} - \cos^{-1}\sin\frac{\theta}{2}\right] \quad$$

where

P: pitch of the groove;
R: radius of the screw between the longitudinal axis of the screw and its outer peripheral surface;
r: radius of the screw between the longitudinal axis of the screw and the bottom of the groove;
$\theta$: angle of division between the sections of the mold; and
L: a half of the difference in width between the top and bottom of the groove.

The cross sectional shape of the groove enables the molding of a head screw from plastics. The screw molded from plastics is light in weight, has a low moment of inertia and provides improved reliability in mechanism control. It has a low coefficient of friction and does not require any lubrication. This invention enables the production of a lead screw in a greatly shortened time, as no cutting work is involved, and a constant supply of lead screws of high quality on a mass-production basis. The lead screw of this invention is inexpensive to manufacture.

DETAILED DESCRIPTION OF THE INVENTION

Figure 1:
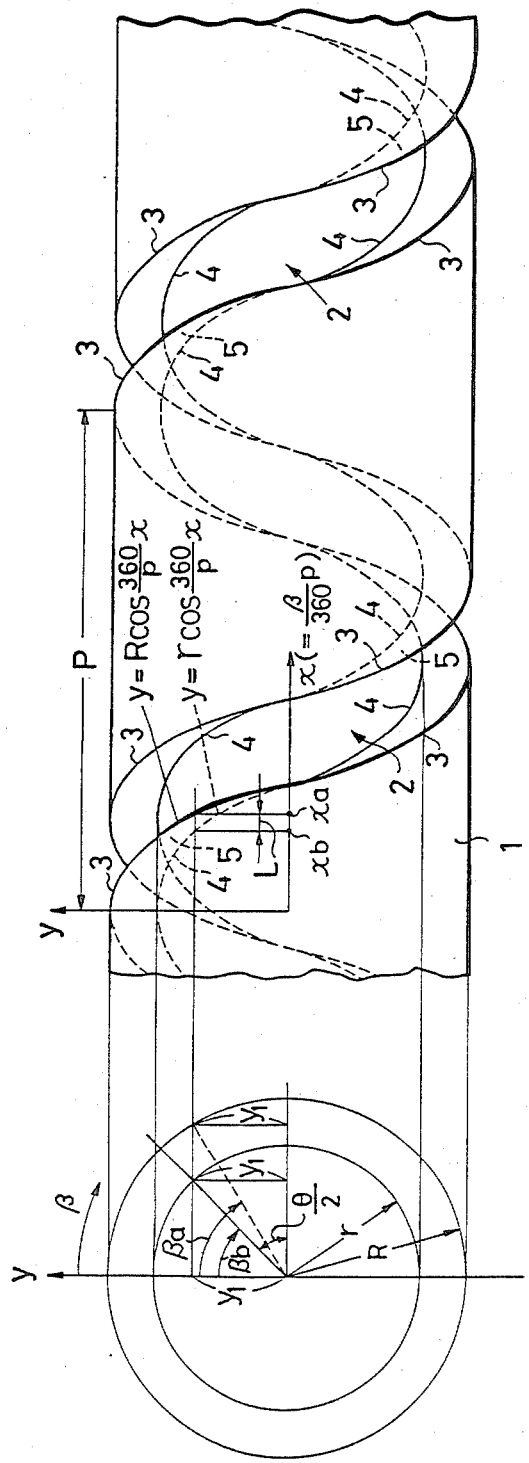
FIG. 1 is a view prepared for describing the shape of a groove on a conventional lead screw.
Figure 2:
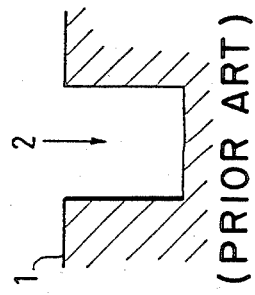
FIG. 2 is a cross sectional view of the groove shown in FIG. 1.

Referring again to FIG. 1 of the drawings, if the lead screw 1 has a particular angle $\beta$ of rotation, the lead x of the groove 2 is expressed as follows:

$$x = \frac{P}{360}\beta \quad (1)$$

where P stands for the pitch of the groove 2.

When the lead screw 1 is looked at in front elevation, the outer edge 3 of the groove 2 is expressed as follows:

$$y = R\cos\beta \quad (2)$$
$$= R\cos\frac{360}{P}\beta$$

and its inner edge 4 is expressed as follows:

$$y = r\cos\beta \quad (3)$$
$$= r\cos\frac{360}{P}x$$

where R and r represent the radius of the lead screw 1 between its longitudinal axis and outer peripheral surface and between its longitudinal axis and the bottom of the groove 2, respectively.

If Xa and Xb represent the x-coordinates of the outer and inner edges 3 and 4, respectively, at a height $y_1$ from the longitudinal axis of the screw 1, the difference between Xa and Xb (Xa−Xb) indicates the amount of an undercut (or the width of the invisible portion of the bottom of the groove 2) at $y_1$. If $\beta$a and $\beta$b represent the angles of rotation of the outer and inner edges 3 and 4, respectively, from the y-axis about the longitudinal axis of the lead screw 1, the amount of Xa−Xb is expressed by the following equation:

$$Xa - Xb = \frac{P}{360}(\beta a - \beta b) \quad (4)$$

$\beta$a and $\beta$b are expressed as follows:

$$\beta a = \cos^{-1}\frac{y_1}{R} \quad (5)$$

-continued $$= \cos^{-1} \frac{r \sin \frac{\theta}{2}}{R}$$

and $$\beta b = \cos^{-1} \frac{y_1}{r} \qquad (6)$$

$$= \cos^{-1} \frac{r \sin \frac{\theta}{2}}{r}$$

$$= \cos^{-1} \sin \frac{\theta}{2}$$

If equations (5) and (6) are substituted into equation (4), the following equation is obtained:

$$Xa - Xb = \frac{P}{360} \left[ \cos^{-1} \frac{r \sin \frac{\theta}{2}}{R} - \cos^{-1} \sin \frac{\theta}{2} \right] \qquad (7)$$

Figure 3:
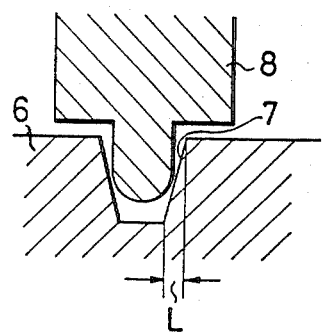
FIG. 3 is a cross sectional view showing by way of example the shape of a groove formed in accordance with this invention.

In view of the relationship represented by equation (7), a lead screw 6 embodying this invention has a groove 7 formed within a body of the lead screw 6 as shown in FIG. 3. The groove 7 has a narrowed bottom and slanting sidewalls. Each slanting sidewall narrows the bottom of the groove 7 by the amount which is indicated at L. The amount of L is expressed as follows:

$$L \geq \frac{P}{360} \left[ \cos^{-1} \frac{r \sin \frac{\theta}{2}}{R} - \cos^{-1} \sin \frac{\theta}{2} \right] \qquad (8)$$

where $\theta$ stands for the angle of division between the sections of a split mold. If the values of L, P, R, r and $\theta$ are selected so as to satisfy equation (8), no undercut is formed, and the lead screw can be molded from plastics. Numeral 8 in FIG. 3 designates a carriage 8 engaged in the groove 7 for movement to the right or left upon rotation of the lead screw 6. In operation, the carriage 8 undergoes linear movement in response to rotation of the lead screw 6.

The groove 7 is preferably so shaped that the screw piece 8 may not be subjected to any substantial vertical component of a force. It is, therefore, preferable that the sidewalls of the groove 7 have a small angle of inclination. The angle of inclination of the sidewalls can be reduced if a mold comprising a greater number of sections is used, or if the pitch P of the groove 7 is shortened. The latter method is preferable, since a mold comprising a greater number of sections is complicated in construction.

There is also known a lead screw having another groove for the return of a carriage in addition to the groove for its advance. The groove for the return of the carriage has a greater pitch to raise the speed of its return. In a lead screw of this type, it is necessary that the groove in the return of the carriage satisfy the relationship expressed by equation (8).

Figure 4A:
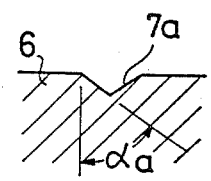
FIGS. 4A to 4D are cross sectional views showing several other differently shaped grooves according to this invention.
Figure 4B:
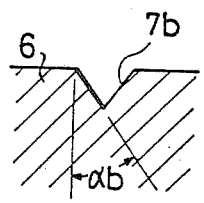
Figure 4C:
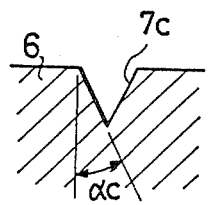
Figure 4D:
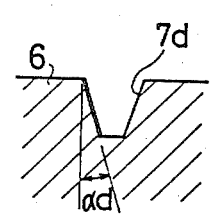

If the groove for the return of the carriage has, for example, a pitch of 25.4 mm/rev., while the lead screw has a diameter (2R) of 15 mm, the groove has an angle $\alpha_a$ of inclination of 56.5° as shown at 7a in FIG. 4A, if a mold having a pair of mold sections is used. If a mold having three mold sections is used, the groove has an angle $\alpha_b$ of inclination of 35.9° as shown at 7b in FIG. 4B. If the mold comprises four mold sections, the groove has an angle $\alpha_c$ of inclination of 25.9° as shown at 7c in FIG. 4C. If the mold six comprises six sections, the groove has an angle $\alpha_d$ of inclination of 16.7° as shown at 7d in FIG. 4D.

A split mold adapted for the production of a lead screw having both of the grooves for the advance and return of a carriage is preferably composed of a plurality of mold sections which are identically shaped except for the opposite ends of the grooves so that the mold may be simplified in construction as far as possible. This requirement can be met by selecting appropriately the pitches of the two grooves and employing as lines for the division of mold sections a plurality of straight lines passing longitudinally through the intersections of the two grooves. This arrangement provides a split mold of simple construction comprising a plurality of mold sections which are identical in groove contour.

Figure 5:
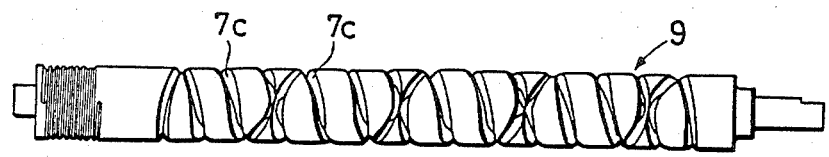
FIG. 5 is a front elevational view of a lead screw embodying this invention.

A lead screw satisfying these requirements is shown at 9 in FIG. 5. The lead screw 9 has a first groove for the advance of a carriage (as shown in FIG. 3 at 8) and a second groove for its return. The second groove has a pitch which is three times greater than the pitch of the first groove. The intersections of the two grooves coincide with four straight lines extending longitudinally of the screw 9 and spaced apart from one another by 90° around the screw 9. This enables the use of a mold comprising four mold sections. If the second groove has a pitch of 25.4 mm/rev., while the lead screw has a diameter (2R) of 15 mm, and if the four mold sections have an angle $\theta$ of division of $(2\pi/4)$, the groove is of the shape shown at 7c in FIG. 4C, and its sidewalls have an angle $\alpha_c$ of inclination of 25.9°. This shape does not subject the carriage 8 to any substantial vertical component of a force.

Figure 7:
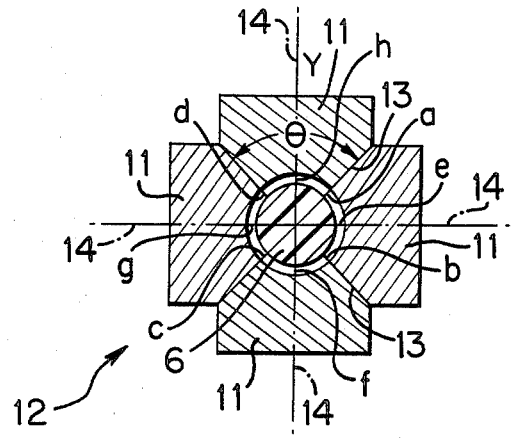
FIGS. 7 and 8 are cross sectional views showing two different molds which can be used to produce the lead screw of the present invention.

As shown in FIG. 7, the lead screw 6 may be produced by means of a split mold 12 having four longitudinally extending metal mold sections 11.

If the mold 12 is used to produce the lead screw shown in FIG. 5, the intersections of the first and second grooves appear at the four positions e, f, g, h indicated in FIG. 7 when the lead screw 6 is viewed from the side, each of these intersections e, f, g, h lying on a radial line 14 through the mold 12. It will be noted that each of the side walls 13 extends along a line disposed midway between two adjacent radial lines 14. Thus in the case of the mold 12 of FIG. 7, each of the intersections e, f, g, h is disposed midway between a pair of adjacent parting lines a, b, c, d.

Figure 8:
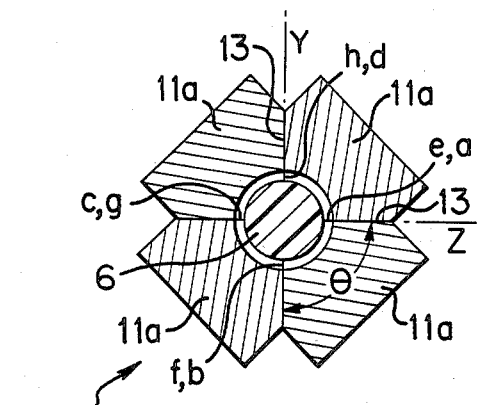

In the case of the four part split mold 12a shown in FIG. 8, the parting line a is disposed at the intersection e, the parting line b is disposed at the intersection f, the parting line c is disposed at the intersection g, and the parting line d is disposed at the intersection h. Thus in this case each of the side walls 13 extends through the respective intersection of the first and second grooves.

Although the invention has been described with reference to a preferred embodiment thereof, it is possible to obtain a variety of modifications by employing a mold comprising a different number of mold sections or forming a differently pitched groove if they satisfy the requirements of equation (8). In a lead screw having a means, other than a groove, for the return of a carriage, its grooves for the advance of the carriage satisfies the requirements of equation (8).

Figure 6:
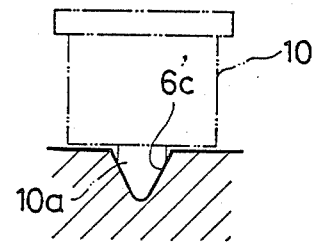
FIG. 6 is a cross sectional view showing the shape of still another groove according to this invention.

A differently shaped groove is shown at 6'c in FIG. 6.

It has an arcuately shaped bottom in cross section, and a carriage 10 has a projection 10a which is substantially complementary to the groove 6'c. It is also possible to use a mold split along the lines displaced by 45° about the longitudinal axis of the lead screw from the lines passing through the intersections of the grooves.

What is claimed is:

1. A lead screw formed with first and second helical grooves crossing one another within the body of the lead screw, the grooves being smaller at the bottom than at the top, the lead screw being formed from a plastic and being molded from the plastic by means of a mold comprised of a plurality of mold sections separable in the circumferential direction, the parting lines between the mold sections passing through the intersections between the grooves or midway between lines passing through the intersections, the grooves satisfying the following relationship;

$$L \geq \frac{P}{360}\left[\cos^{-1}\left(\frac{r}{R}\sin\frac{\theta}{2}\right) - \cos^{-1}\sin\frac{\theta}{2}\right]$$

wherein
P is the pitch of the respective grooves,
R is the radius of the lead screw,
r is the radius of the lead screw between the longitudinal axis and the bottom of the grooves,
θ is the angle of division of the mold sections, and
L is the difference in width between the top and bottom of the grooves.

2. A lead screw as claimed in claim 1, wherein the first groove is for the advance of a carriage movable with the lead screw and the second groove is for the return of the carriage.

3. A lead screw as claimed in claim 1, wherein the second groove has a pitch which is three times greater than the pitch of the first groove.

4. A lead screw as claimed in claim 1, wherein the mold has four sections.

5. A molded plastic lead screw produced by molding from plastic by means of a longitudinally split mold having a plurality of longitudinally-extending mold sections, said screw having a helical groove formed within the body of the screw, and satisfying the following relationship:

$$L \geq \frac{P}{360}\left[\cos^{-1}\left(\frac{r}{R}\sin\frac{\theta}{2}\right) - \cos^{-1}\sin\frac{\theta}{2}\right]$$

wherein
P is the pitch of the screw;
R is the radius of the screw;
r is the radius of the screw between its longitudinal axis and the bottom of the grooves;
θ is the angle of division of the mold sections; and
L is the difference in width between the top and bottom of the grooves.

* * * * *